US007762887B1

(12) United States Patent
House et al.

(10) Patent No.: US 7,762,887 B1

(45) Date of Patent: Jul. 27, 2010

(54) SYSTEMS AND METHODS FOR ELECTRONICALLY MANAGING GAMES

(75) Inventors: Gene House, Frisco, TX (US); John J. Gately, Frisco, TX (US); Luke Keiser, Frisco, TX (US)

(73) Assignee: G&G Technologies LLC, Frisco, TX (US)

( * ) Notice: Subject to any disclaimer, the term of this patent is extended or adjusted under 35 U.S.C. 154(b) by 641 days.

(21) Appl. No.: 11/633,363

(22) Filed: Dec. 4, 2006

(51) Int. Cl.
*G06F 17/00* (2006.01)

(52) U.S. Cl. .......................................................... 463/25

(58) Field of Classification Search ............. 463/16–25; 273/274
See application file for complete search history.

(56) References Cited

U.S. PATENT DOCUMENTS 5,413,353 A 5/1995 Demarest et al.
5,489,101 A 2/1996 Moody
5,513,850 A 5/1996 Vancura
5,651,548 A 7/1997 French et al.
5,735,742 A 4/1998 French
5,810,360 A 9/1998 Srichayaporn
6,015,347 A 1/2000 Maahs et al.
6,108,632 A 8/2000 Reeder et al.
6,135,453 A 10/2000 Srichayaporn
6,179,290 B1 1/2001 Maahs
6,234,483 B1 5/2001 Bucan
6,443,455 B1 * 9/2002 Webb ......................... 273/274
6,488,284 B2 12/2002 Webb
6,536,769 B1 3/2003 Palacios et al.
6,626,757 B2 9/2003 Oliveras
6,676,128 B2 1/2004 Wolf
7,144,830 B2 12/2006 Hill et al.
7,317,664 B2 1/2008 Klein
7,413,513 B2 * 8/2008 Nguyen et al. ................ 463/39
2003/0070178 A1 4/2003 Boyd et al.
2005/0164789 A1 7/2005 Nakamura et al.
2005/0282604 A1 12/2005 Hernandez et al.
2006/0058082 A1 3/2006 Crawford, III et al.
2006/0058083 A1 3/2006 Crawford, III et al.
2006/0058084 A1 3/2006 Crawford, III et al.
2006/0058085 A1 3/2006 White et al.
2006/0058086 A1 3/2006 White et al.
2006/0058087 A1 3/2006 White et al.
2006/0058089 A1 3/2006 White et al.

(Continued)

OTHER PUBLICATIONS

Pajich, Bab, and Burton, Earl, "The First and Only Authentic Casino Dealer Button with a Built-In Timer for Texas Hold'em!" www.buttontimer.com/bt.asp, pp. 1-4, Published in 2006.

(Continued)

*Primary Examiner*—Ronald Laneau
(74) *Attorney, Agent, or Firm*—Fulbright & Jaworski L.L.P.

(57) ABSTRACT

Systems and methods for the electronic management of games are described. In one exemplary embodiment, a system comprises an electronic dealer device for storing, processing, and displaying card game information. The electronic dealer device provides portions of the game information to a player throughout different stages of the game. The electronic dealer device also transmits at least a portion of the game information to a forced bet device, such as, for example, a blind button. The dealer and blind buttons or devices concurrently display game information during the card game in a coordinated fashion.

35 Claims, 7 Drawing Sheets

U.S. PATENT DOCUMENTS

| | | | |
|---|---|---|---|
| 2006/0058090 A1 | 3/2006 | Crawford, III et al. | |
| 2006/0058091 A1 | 3/2006 | Crawford, III et al. | |
| 2006/0058092 A1 | 3/2006 | Crawford, III et al. | |
| 2006/0066052 A1 | 3/2006 | White et al. | |
| 2006/0068093 A1 | 3/2006 | Shite | |
| 2006/0068498 A1 | 3/2006 | White et al. | |
| 2006/0068864 A1 | 3/2006 | White et al. | |
| 2006/0068865 A1 | 3/2006 | White et al. | |
| 2006/0068866 A1 | 3/2006 | White et al. | |
| 2006/0068867 A1 | 3/2006 | White et al. | |
| 2006/0068868 A1 | 3/2006 | Crawford, III et al. | |
| 2006/0068869 A1 | 3/2006 | White et al. | |
| 2006/0068871 A1 | 3/2006 | Crawford, III et al. | |
| 2006/0068879 A1 | 3/2006 | Crawford, III et al. | |
| 2006/0068899 A1 | 3/2006 | White et al. | |
| 2006/0119042 A1 | 6/2006 | Schreiner | |
| 2006/0121973 A1 | 6/2006 | Parisien | |
| 2006/0189365 A1 | 8/2006 | Crawford, III et al. | |
| 2006/0205466 A1 | 9/2006 | White et al. | |
| 2006/0205467 A1 | 9/2006 | White et al. | |
| 2006/0255433 A1 | 11/2006 | Xu | |
| 2007/0021170 A1 | 1/2007 | Cooper | |
| 2007/0075491 A1 | 4/2007 | Mongkolkasetarin | |
| 2008/0234024 A1 * | 9/2008 | Connors et al. | 463/11 |
| 2008/0268956 A1 * | 10/2008 | Suzuki | 463/37 |

OTHER PUBLICATIONS

"DB Dealer," www.dbdealer.com, pp. 1-2, Published in 2006.
"Tournament Edition Texas Holdem Dealer Button w/Timer," www.pokernstuff.com/index.asp?PageAction=VIEWPROD&ProdID=252, pp. 1-2, Published in 2004.
"Poker Tek," www.pokertek.com/index.html, pp. 1, Published in 2005/2006.
"Take Your Game to the Ultimate Level," www.ultimatedealerbutton.com/body.htm, pp. 1-3, Published in 2006.

* cited by examiner

SYSTEMS AND METHODS FOR ELECTRONICALLY MANAGING GAMES

TECHNICAL FIELD

The present invention relates, in general, to gaming, and, more specifically, to the electronic management of games.

BACKGROUND

Poker is a game in which players with fully or partially concealed cards make wagers into a central pot. The pot is awarded to the player or players with the best combination of cards, or to the player who makes an uncalled bet. The most popular types of games can be classified as: draw games (e.g., five-card draw), stud games (e.g., seven-card stud), and community card games (e.g., Texas Hold'em). Despite its many variants, most poker games follow the same basic pattern of play. The right to deal each hand rotates among the players and is marked by a plastic disk called the "dealer button." The dealer button is rotated clockwise among the players to indicate who the dealer is and to determine the due order of betting.

For each hand played, one or more players may be required to make forced bets that create an initial stake for which the players will contest. These forced bets are called "blinds" and "antes." Specifically, the player immediately to the left of the dealer posts a "small blind," and the player to the left of the small blind posts a "big blind." The amount of the big blind is equal to the minimum bet for that round, and it is often twice the amount of the small blind. In addition, when antes are in effect, every player at the table is forced to make a minimum bet. These forced bets may be increased during different stages of the game so as to induce players to enter pots as the game progresses.

In order to keep track of which players are expected to post blinds when hands are dealt, additional buttons may be used. Hence, in a typical poker game, the dealer button indicates which player is dealing, a "big blind button" shows which player is posting the big blind, and a "small blind button" indicates which player is posting the small blind. After the cards are dealt, the player to the left of the big blind is the first to act in that round. Further, each stage of the game may have several rounds. Thus, for the game to advance to its next stage, one of the players typically keeps track of time and announces forced bet increases at predetermined time intervals.

Poker is a difficult game to manage. First, it is very difficult for players, particularly novice players, to remember what the blind amounts are when it is their turn to be in a blind position. Moreover, it is also difficult to properly time or clock different stages within the game so that binds and/or antes increase in a consistent and fair manner. In addition to human error, it is common for time keepers to use that information to his or her advantage by announcing increases when it is most convenient to him or her. These problems become even more evident in the case of multi-table tournaments, where two or more groups of players gather around two or more tables and play separate decks of cards, while one person attempts to coordinate the tournament by synchronizing game stages and blind increases across the various tables.

BRIEF SUMMARY

Representative embodiments of the present invention are directed to systems and methods for automated game management. In one exemplary embodiment, the present invention provides a system and method for automatically managing a card game such as, for instance, a poker game (e.g., Texas Hold'em). Accordingly, a system comprises an electronic dealer device or button capable of storing, processing, and displaying game information. Examples of game information includes, but is not limited to, the current game level or stage number, the time remaining before the end of the current stage in the form of a countdown clock or timer, and the amount of one or more forced bets during that stage (i.e., big blind, small blind, and/or ante), the total time elapsed, etc. The dealer device may also store, process, and display game statistics and other data such as, for example, the duration of each play, the number of times each player has made a bet, the number of hands played, etc. In addition, the dealer device or button may also display other information such as, for example, advertisements.

Information may be presented by the dealer device during an ongoing, live game. The dealer device may also precisely time each stage of the game, which may be configured or set in advance, and may temporarily pause the game and resume it at a later time. Additionally, the electronic dealer device or button may also gather game progress data (e.g., how many times the game was paused, at what stage the game ended, etc.) and store that information for later use.

Electronic dealer devices according to exemplary embodiments of the present invention may transmit at least a portion of the game information to electronic forced bet devices. For instance, an electronic forced bet device or button may be an electronic big blind or small blind button that displays at least a portion of the game information received from the electronic dealer device. The transmission of game information may be performed wirelessly. As a result, the electronic dealer and blind devices may concurrently display game information in a coordinated fashion throughout the game.

In another exemplary embodiment, a card game management system includes a master dealer button and a slave dealer button. Each of these dealer buttons may have a distinct set of forced bet buttons associated therewith. As such, a master set may be used in one game table, while a slave set is used in another game table. The master dealer button transmits game information not only to the forced bet buttons of its own set, but also the slave dealer button at the other table. Subsequently, the slave dealer button transmits game information received from the master dealer button to its own forced bet buttons. This embodiment is capable of coordinating and synchronizing a single game being played across multiple tables.

Game information used by the electronic dealer button or device to manage the game may be programmed in a host computer or the like and then installed or downloaded into the dealer button. For example, the host computer may contain software that provides pre-existing game templates selectable by a user. Alternatively, the user may create a template based on information such as, for example, the desired duration for the entire game, the number of stages, and the number of initial players, etc. The user may also create his or her own game template arbitrarily. In addition, the user may upload game progress information gathered by the dealer button to the host computer.

In at least one embodiment, the user may utilize the host computer to connect to a web server via a network, and thereby access templates and other services, such as community-type services. Examples of community-type services include player profiles, online groups, message boards, wikis, and the like. The user may then install game templates obtained through the web server into the electronic dealer button device. The user may also upload game progress information to the server, which then calculates statistics associated with the template used, and shares that information with other users.

In yet another embodiment, a server is remotely located with respect to a plurality of card game tables. The game tables may themselves be remotely located with respect to each other, and each table may have at least one electronic card game management device disposed thereon. The server may facilitate communication between remote devices (e.g., between a master and a slave button). Alternatively, the server may manage a card game being played across the plurality of tables by issuing instructions containing card game information to the electronic card game management devices in the various locations. These instructions may be broadcast, for example, via the Internet. Accordingly, this embodiment allows a live card game to be coordinated between two or more remote locations. Further, this embodiment also allows management of hybrid tournament where some players play at live table games while others play at virtual tables (i.e., online).

In still another embodiment, the present invention provides an electronic game management device that acquires a player identification (e.g., by scanning a player's card, RFID chip, etc.) and retrieves the player's information, whether he or she is at game table, and in what position he or she is sitting with respect to other players at the same table. The electronic game management device may also be capable of reading smart chips that allow a player to automatically see the total amount of chips in a pot and/or his or her chip stack without having to manually count it. This information may be displayed on the electronic game management device itself. Additionally or alternatively, the information may be communicated to a electronic monitor or sign that displays a table number, a player identification, and his or her chip count. Further embodiments of the present invention may also provide an "all-in" electronic chip that broadcasts to the monitor an indication that a player has bet all of his or her chips, so that attention can be focused on that particular play.

The present invention provides numerous advantageous features that have not existed in the prior art. First, some of the embodiments disclosed herein can keep track of and present relevant game information needed by the players throughout a live game. These electronic devices relieve players from the burden of managing otherwise important aspects of the game, while assuring that the game is fairly played. Other embodiments of the present invention also make it possible to synchronize or coordinate a poker game or tournament being played across separate tables in the same physical location, or across tables that are remotely located with respect to each other.

The foregoing has outlined rather broadly certain features and technical advantages of the present invention so that the detailed description that follows may be better understood. Additional features and advantages are described hereinafter. As a person of ordinary skill in the art will readily recognize in light of this disclosure, specific embodiments disclosed herein may be utilized as a basis for modifying or designing other structures for carrying out the same purposes of the present invention. Such equivalent constructions do not depart from the spirit and scope of the invention as set forth in the appended claims. Several inventive features described herein will be better understood from the following description when considered in connection with the accompanying figures. It is to be expressly understood, however, the figures are provided for the purpose of illustration and description only, and are not intended to limit the present invention.

BRIEF DESCRIPTION OF THE DRAWINGS

For a more complete understanding of the present invention, reference is now made to the following drawings, in which.

DETAILED DESCRIPTION

In the following description, reference is made to the accompanying drawings that form a part hereof, and in which exemplary embodiments of the invention may be practiced by way of illustration. These embodiments are described in sufficient detail to enable a person of ordinary skill in the art to practice the invention, and it is to be understood that other embodiments may be utilized, and that changes may be made, without departing from the spirit of the present invention. The following description is, therefore, not to be taken in a limited sense, and the scope of the present invention is defined only by the appended claims.

Figure 1A:
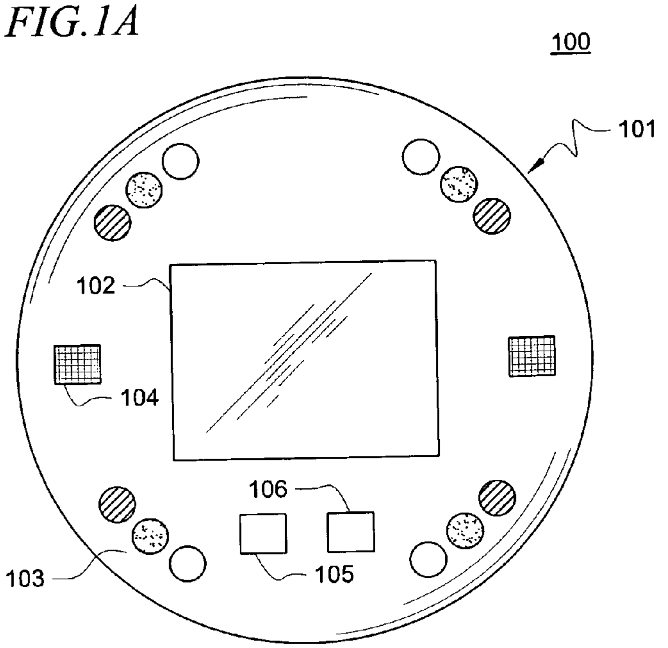
FIGS. 1A and 1B show top and lateral views of an electronic game management device, respectively, according to embodiments of the present invention.
Figure 1B:
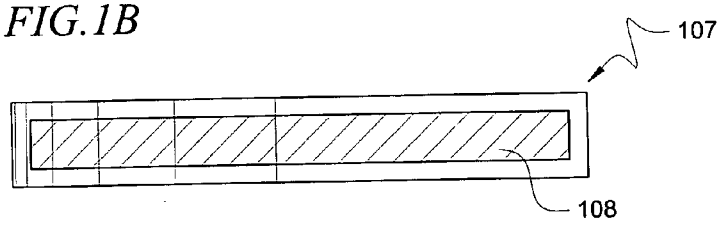

FIGS. 1A and 1B respectively show top 101 and lateral 107 views of electronic game management device 100 according to exemplary, non-limiting embodiments of the present invention. Electronic game management device 100 may have the shape of a dealer or forced bet (i.e., big blind and small blind) button. For example, device 100 may comprise a case having physical dimensions of approximately 2½ inches in diameter and ½ inch in height. Device 100 further comprises display 102, as well as buttons 105 and 106, which together provide a user or player interface. Display 102 may be, for example, a graphic LCD display unit and may be located on the top surface of device 100. In alternative embodiments, display 102 may be located or wrapped around the lateral surface of device 100. In yet other alternative embodiments, display 102 may comprise a holographic projection device or volumetric display device. Buttons 105 and 106 provide a user input mechanism and may be push buttons or the like. Alternatively or additionally, the user input mechanism may be provided in the form of a touch screen, voice recognition, remote keypad, and pointing device, among others.

Device 100 also comprises optional visual and audio units 103 and 104, respectively, which may be located anywhere on the device. In one exemplary embodiment, visual unit 103 may include a set of LEDs of different colors (e.g., green, yellow, and red) placed around the perimeter of the device, and audio unit 104 may comprise a piezoelectric element or a loudspeaker. Lateral view 107 shows optional advertising space 108 located on the side surface of device 100. Additionally or alternatively, ads may also be displayed on other surfaces of device 100 and/or via display 102.

In one embodiment, device 100 may be used as an electronic dealer button. In other embodiments, device 100 may be employed as an electronic forced bet button. Accordingly, device 100 may have different physical configurations depending on what type of button it implements. For instance, push buttons 105 and 106 and/or optional visual and audio units 103 and 104 may be absent from an electronic forced bet button. Also, a dedicated slave dealer button may not have some or all of the features described above. In fact, device 100 may be programmed or configured differently depending upon whether it implements a dealer button, a master dealer button, a slave dealer button, a big blind button, a small blind button, etc. As such, device 100 may contain software or instructions that identify a particular type of button, and that implements its functions accordingly.

Figure 2:
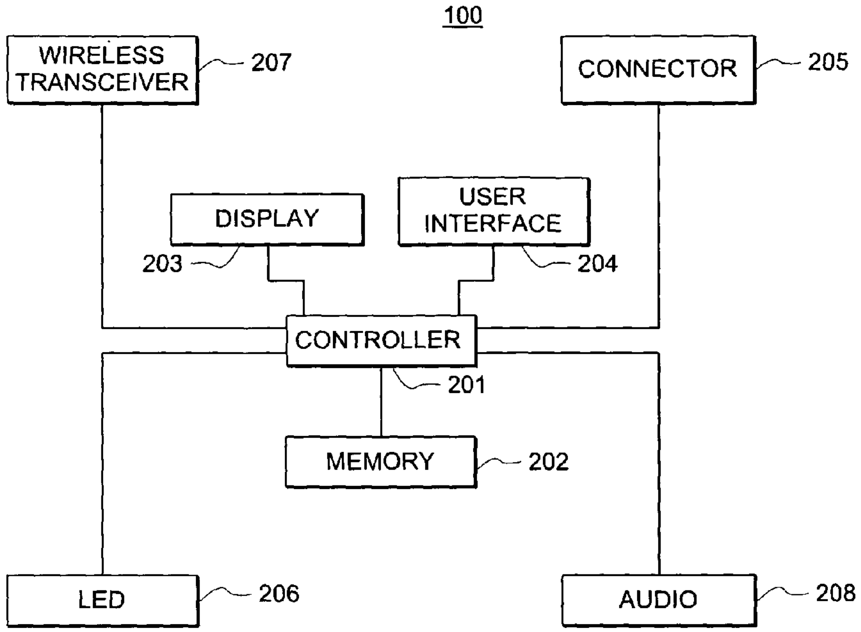
FIG. 2 shows a block diagram of the electronic game management device shown in FIG. 1 according to an embodiment of the present invention.

Turning now to FIG. 2, a block diagram of electronic game management device 100 shown in FIG. 1 is depicted according to an exemplary, non-limiting embodiment of the present invention. Controller 201 is coupled to memory module 202, user interface module 204, and display module 203. Controller 201 is also coupled to wireless transceiver 207, connector module 205, and optional visual and sound modules 206 and 208. In one alternative embodiment, wireless transceiver 207 and connector module 205 may be replaced by a single communication module.

Memory module 202 may be any type of memory including, for instance, EEPROM, flash, or the like. Further, memory module 202 contains code executable by controller 202 for proper operation of device 100, and may also include a unique serial number or some other form of device identification known in the art such as, for example, Electronic Identification Number (EIN), Media Access Control (MAC), and the like. Memory module 202 also stores the information that is presented to a player by display module 203 during a game. Meanwhile, user interface 204 comprises push buttons, voice recognition, optical sensors, and/or motion sensors that may be used to turn device 100 on and off, program card game information into memory module 202, pause an ongoing game, "call the clock" on a player, etc. Optional visual and audio modules 206 and 208 present warnings to a player during the game and/or indicate a status of operation of device 100.

Figure 3:
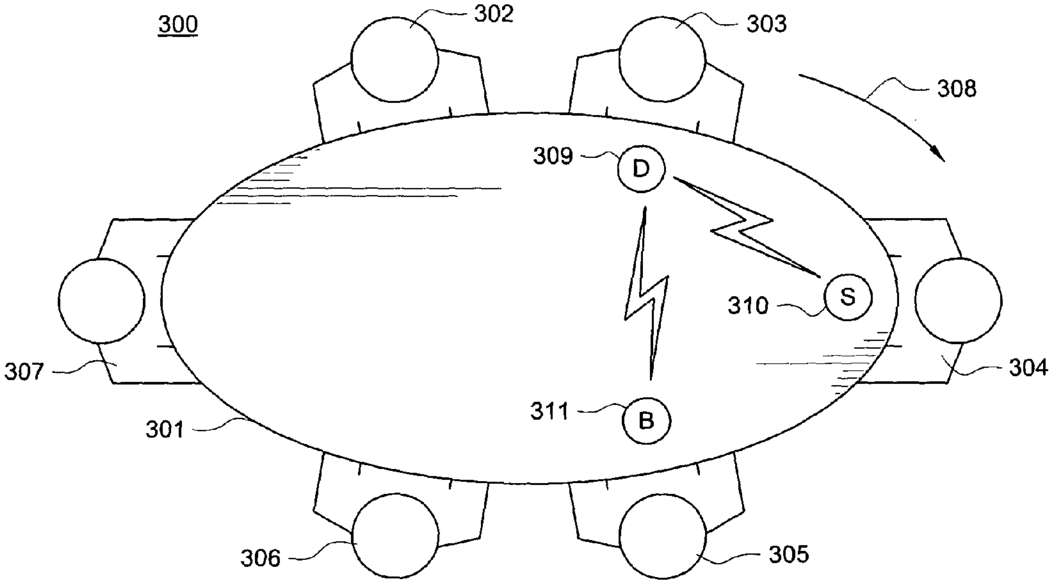
FIG. 3 shows a diagram of a game management system according to an embodiment of the present invention.

Connector module 205 may provide, for example, USB, FireWire, or any other type of standard or proprietary wired connectivity now existing or yet to be developed. Further, wireless transceiver 207 may provide, for example, ZigBee, Bluetooth, WiFi, infrared, or any other type of standard of proprietary wireless connectivity now existing or yet to be developed. As such, connector module 205 and/or wireless transceiver 207 allows device 100 to connect to a computer or other type of host in order to download and upload code or data stored in memory 202. Connector module 205 and/or wireless transceiver 207 allow device 100 transmit game information to other devices similar to device 100, as illustrated in FIG. 3. In addition, connector module 205 and/or wireless transceiver 207 may be operable to broadcast game information to computers, televisions, electronic displays, monitors, projectors, handheld devices, personal digital assistants (PDAs), mobile phones, etc.

FIG. 3 shows a diagram of game management system 300 according to one embodiment of the present invention. Players 302-307 gather around table 301 to play a game such as, for example, a poker game. In the round depicted, player 303 is in the dealer position, player 304 is in the small blind position, and player 305 is in the big blind position. As such, player 303 has electronic dealer button 303 in front of him or her, while players 304 and 305 have electronic small and big blind buttons 310 and 311 in front of them, respectively. After each round or dealing, the electronic dealer and blind buttons 309-311 circulate around table 301 to the next players in clockwise direction 308.

According to one exemplary embodiment of the present invention, each of electronic dealer and blind buttons 309-311 may be an electronic device such as the one depicted in FIGS. 1 and 2. As such, electronic dealer device 209 may broadcast at least a first portion of the game information to electronic forced bet device 310 and at least a second portion of the game information to electronic forced bet device 311, for example, using a wireless transmitter. In this embodiment, each of the forced bet buttons 310 and 311 may have device identification information that indicates what type of forced bet device the button corresponds to, which in turn may determine which portions of the game information are received and/or displayed by that particular button (e.g., small or big blind amounts).

Accordingly, electronic devices 309-311 display information to the player in front of, or near them. In order for other players to be able to see the same information if they so desire, an external electronic sign such as an LCD display or a computer may be used (not shown). During normal game play, electronic dealer button 309 may also transmit game information to the external electronic sign or computer, so that all players at a table or multiple tables can see relevant information with respect to the game in progress. Additionally or alternatively, electronic dealer button 309 may broadcast game information to televisions, monitors, projectors, handheld devices, PDAs, cellular phones, etc. In one alternative embodiment, electronic dealer button 309 may have a display that wraps around its case on its lateral surface, thus presenting game information to all players.

In another alternative embodiment, one or more among players 302, 306, 307 may have "repeater" or "display-only" buttons that also present certain game information such as the minimum bet amount in that round (i.e., big blind), ante amount, etc.

According to another exemplary embodiment of the present invention, table 301 may itself be a game management device. For instance, table 301 may comprise at least some of the components described above with respect to FIGS. 1 and/or 2 such that it is capable of storing, processing, and displaying game information. For example, table 301 may have a single screen or a plurality of individual displays positioned for each player at table 301. As such, button positions may change electronically by changing the information displayed on each individual screen. Furthermore, as players leave the game, each screen corresponding to an empty seat position may turn dark, and buttons may pass only among active areas. One advantage of this embodiment is that it provides larger advertising space.

Figure 4:
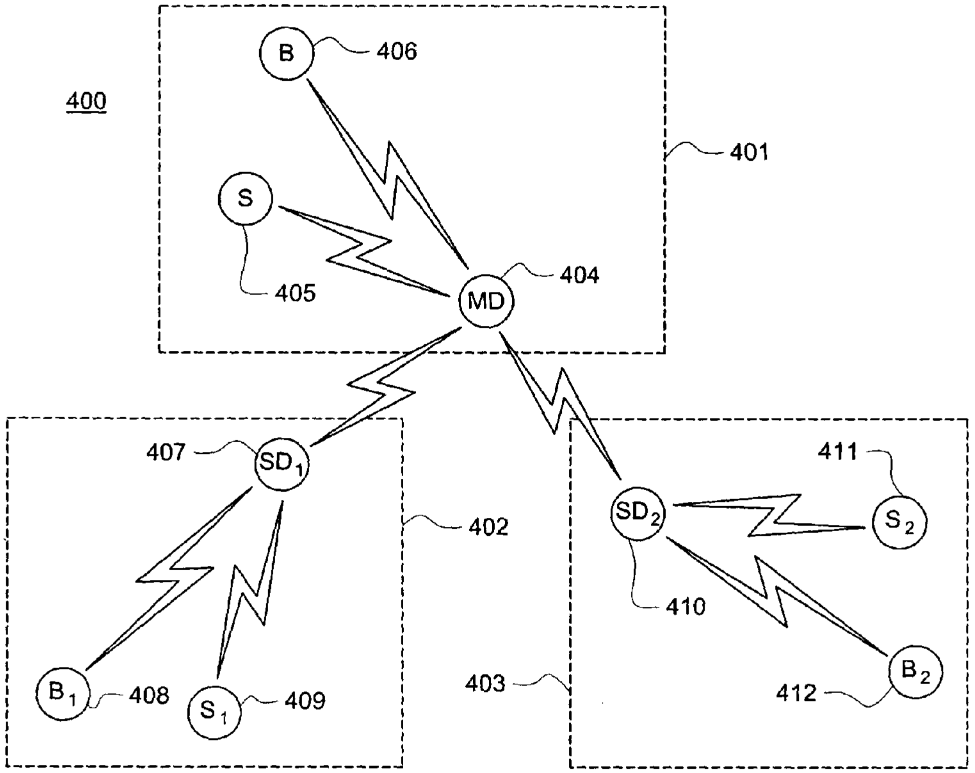
FIG. 4 shows a diagram of a multi-table game management system according to an embodiment of the present invention.

Referring now to FIG. 4, a diagram of multi-table game management system 400 is depicted according to another embodiment of the present invention. In this exemplary embodiment, three sets of electronic game management devices 401-403 are used, and each set is deployed at a different game table, here shown as a three-table tournament. Other embodiments may include more or less sets of devices than those shown in system 400, depending upon the number or players and game tables initially participating in the tournament.

Master game management set 401 has a master dealer button 404 and two forced bet devices 405 and 406. Master dealer button 404 of this embodiment is responsible not only for broadcasting game information to its own set of forced bet buttons, but also for broadcasting the game information to slave dealer devices 407 and 410 of sets 402 and 403, respectively. Slave game management sets 402 and 403 process information received from master set 401, which allows coordination and synchronization of the game across different tables. Specifically, slave dealer button 407 receives game information from master dealer button 404 and transmits all or part of that information to forced bet devices 408 and 409. Similarly, slave dealer button 410 receives game information from master dealer button 404 and transmits all or part of that information to forced bet devices 411 and 412. In one embodiment, devices 404-412 concurrently display different portions of game information during an ongoing game. Furthermore, master dealer device 401 manages the game's progression through different stages so that each of the set of devices 401-403 presents information relating to the same game level.

Figure 5:
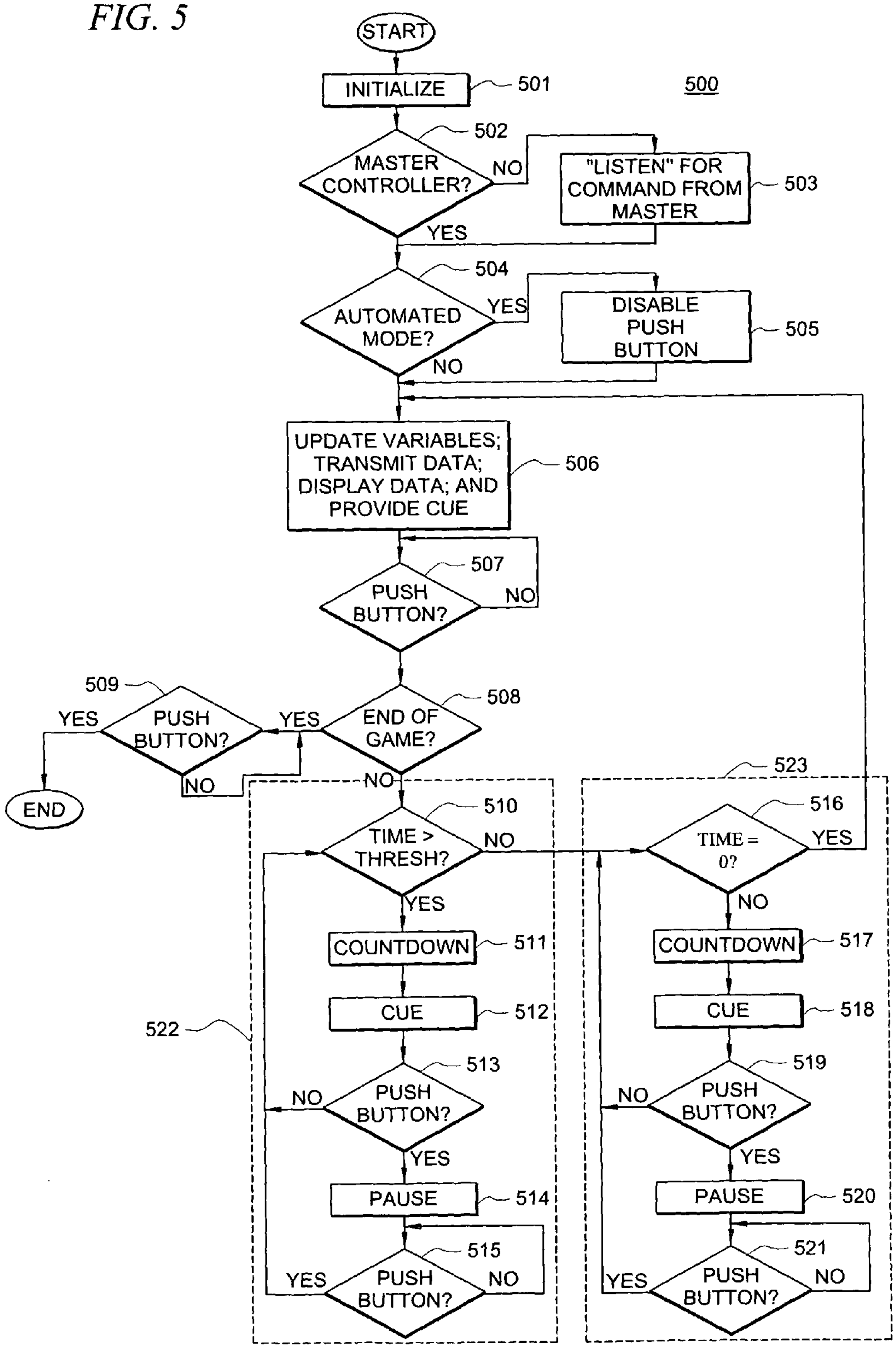
FIG. 5 shows a flow diagram of an electronic dealer device operation method of according to an embodiment of the present invention.

FIG. 5 shows a flow diagram of an electronic dealer device operation method 500 according to an exemplary embodiment of the present invention. The device is powered up and initializes in step 501. In step 502, method 500 determines whether the device is a master device. If the device is not a master dealer button, it is then designated as a slave device and the device listens for commands or messages from a master dealer device in step 503. If the device is a master device, step 504 determines whether the device has been set to operate in automated mode and, if so, it disables at least a portion of a user interface in step 505.

In step 506, method 500 updates game variables or game information stored in the device's memory, transmits at least portions of the game information to forced bet and slave devices, displays game information via a display module, and optionally provides visual or audible cues that the device is in a ready state. Game variables or information may include, but is not limited to, stage number, stage duration, time remaining, amount of ante, amount of big blind, and/or amount of small blind. If progression throughout game stages has not been automated, step 507 waits for user input indicating that the game may move on to the next stage. Then, step 508 determines whether there are any other stages to be played in the game, and awaits user input in step 509 to end the game in case the game is over. Otherwise, method 500 progresses to "in-play" mode 522. Before or after ending the game, the electronic device may store game progress information in its memory for later use. Examples of game progress information include the number of stages played, the duration of each stage, the number of times the game was paused, game template identification, etc.

During in-play mode 522, step 510 determines whether a threshold or warning time for the current stage has been reached. If not, step 511 decrements a counter or timer, and updates the devices display as well as any visual cues. Steps 513-515 allow a user to pause the game via a push button or the like. If step 510 determines that the threshold time has been reached and that the current stage is now in its final minutes, method 500 progresses into warning mode 523. Warning mode 523 operates essentially in the same way as in-play mode 522, but it allows for a different visual or sound cue to be provided in step 518, thus presenting players with an indication that the current state is about to end. When the time countdown reaches zero, control returns to step 506 where method 500 moves the game on to its next state, when applicable.

Still referring to FIG. 5, various optional cues may be provided by visual and/or sound modules of the electronic dealer device. For example, transmission of game information by the dealer device to other buttons may cause a flashing red light in step 506. While operating in "in-play" mode 522, the dealer device may provide a solid green light. Also, warning mode 523 may cause a yellow light to flash. Similarly, examples of sound warnings may include beeps of various pitch and/or periods, as well as reproduction of sound recordings such as verbal warnings or instructions.

In one embodiment, the steps depicted above with respect to electronic dealer device operation method 500 are initiated in response to a menu selection made by a user. The menu may be displayed on the dealer device. As such, the menu may provide additional game options that may be accessed during an ongoing game via the device's user interface (e.g., push buttons). For example, in one embodiment, a user may desire to "call the clock" on another player during a game, and may thus select a "player time clock" feature via the menu. The "player time clock" feature forces a player to act on his or her hand within a preset time period, otherwise his or her hand is folded and the game moves on. Notably, use of this feature during an ongoing game may occur in parallel with the steps depicted in method 500, so that the game is not otherwise interrupted. And, as a person of ordinary skill in the art will immediately recognize in light of this disclosure, other game features may be added to the devices' menu.

Figure 6:
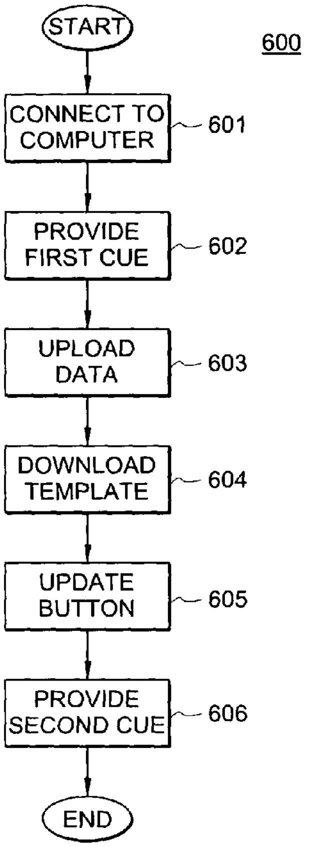
FIG. 6 shows a flow diagram of a computer-based game management method according to an embodiment of the present invention.

Turning now to FIG. 6, a flow diagram of a computer-based game management method 600 is depicted according to an embodiment of the present invention. In this embodiment, an electronic dealer device such as the one depicted in FIGS. 1 and 2 is connected to a computer via a communication or connector module in step 601. In step 602, the electronic device may optionally provide a visual and/or sound cue via its warning modules. In step 603, method 600 may upload game progress data gathered by the electronic device to the computer. Then, in step 604, a user may be prompted to download a game template from the computer into the device.

Game templates may include game information such as, for example, the number of states in the game, number of players, duration of each stage, the amounts of any forced bets during each stage. The template may also determine change the status of the electronic device between master and slave, dealer and forced bet, and/or small and big blinds. As such, the template is used to update the device in step 605, and a second visual and/or sound cue may optionally be provided in step 606. An exemplary game template is provided in Table I below.

TABLE I

Exemplary Game Template

| Stage # | Duration (min.) | Ante ($) | Big Blind ($) | Small Blind ($) |
|---|---|---|---|---|
| 1 | 15 | 0 | 10 | 5 |
| 2 | 20 | 0 | 20 | 10 |
| 3 | 25 | 5 | 40 | 20 |
| 4 | 25 | 15 | 80 | 40 |
| 5 | ∞ | 30 | 160 | 80 |

Again, the exemplary game template presented in Table I above is provided by means of illustration only, and does not limit the scope of the present invention. As a person of ordinary skill in the art will readily recognize in light of this disclosure, any type of game information other than that explicitly discussed herein may be processed and presented using the systems and methods of the present invention. For instance, a game template may also include rules (e.g., poker hand rankings), playing tips, etc.

Figure 7:
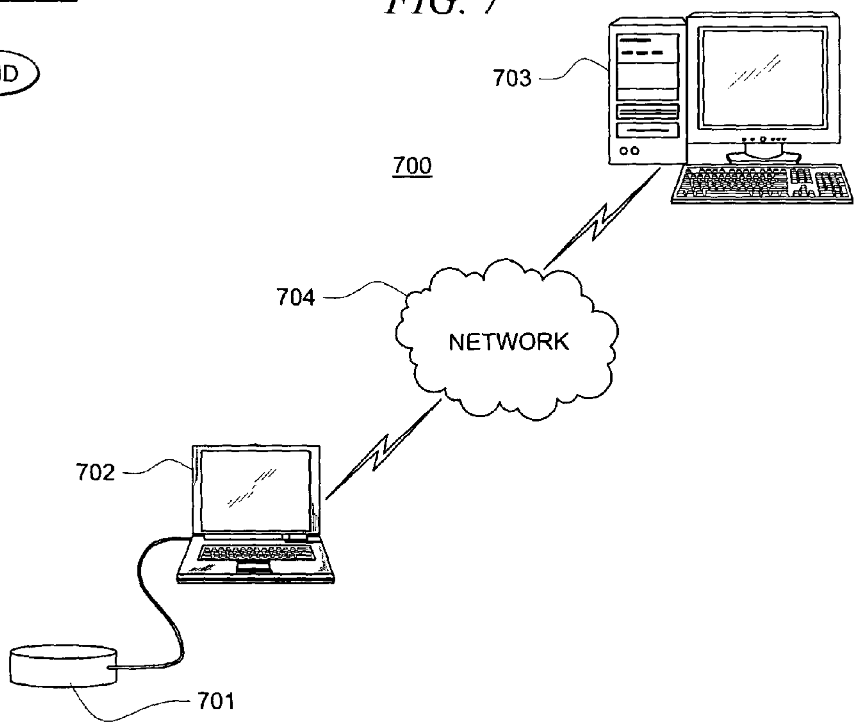
FIG. 7 shows a diagram of a computer-based game management system according to an embodiment of the present invention.

FIG. 7 shows a diagram of a computer-based game management system 700 is depicted according to one exemplary embodiment of the present invention. System 700 may be used, for example, to perform the steps of method 600 shown in FIG. 6. Accordingly, electronic dealer device 701 is connected to a computer 702 via a wired or wireless connection. Computer 702 may be, for example, a personal computer, a laptop, a personal digital assistant (PDA), or the like. As such, computer 702 executes software that updates electronic dealer device 701. For example, a user may create or select a game template stored in computer 702, and then download game information associated with the template into device 701. Additionally or alternatively, computer 702 may communicate with remote server 703 via network 704 and access services provided by server 703 such as, for example, game templates provided by other users and the like. Network 704 may be a local area network (LAN), a wide area network (WAN), or any other type of network. In one embodiment, server 703 is a web server and network 704 is the Internet.

Figure 8:
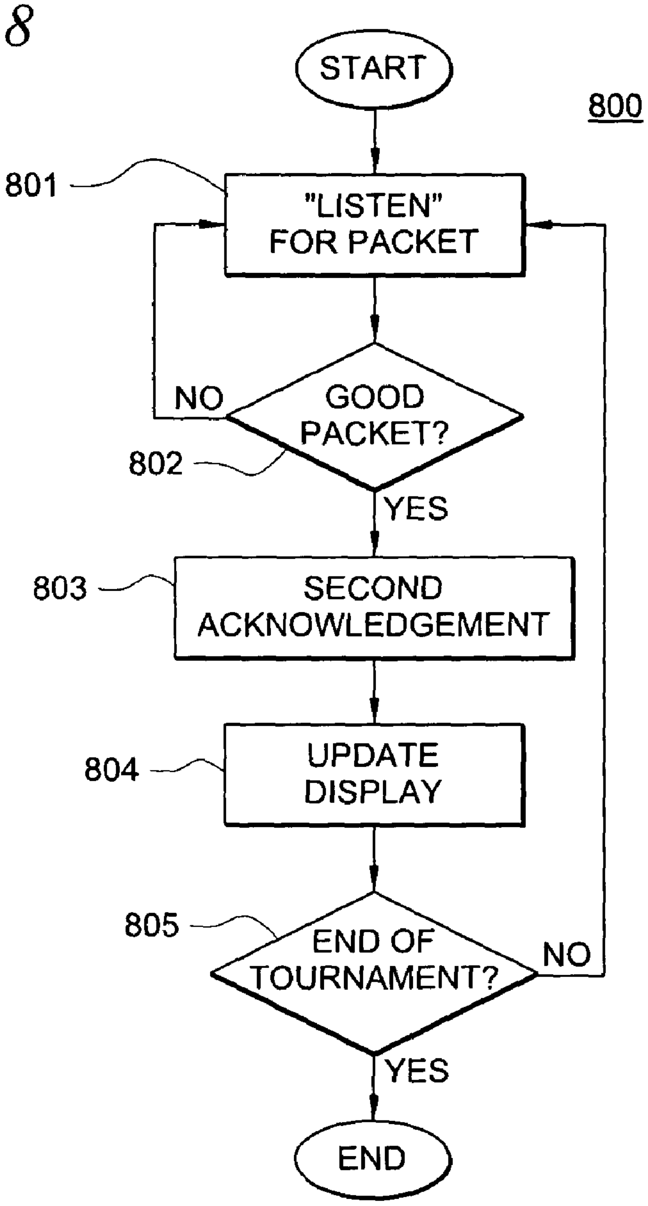
FIG. 8 shows a flow diagram of an electronic forced bet device operation method of according to an embodiment of the present invention.

Referring now to FIG. 8, a flow diagram of operation method 800 of an electronic forced bet device is depicted according to an embodiment of the present invention. In step 801, the electronic forced bet device listens for a game information packet to be received from an electronic dealer device. If the packet is uncorrupted, as determined by step 802, the electronic forced bet device sends an acknowledgement message back to electronic dealer device in step 803. Otherwise, control returns to step 801 and the electronic forced bet device continues listening for valid packets. In step 804, the electronic forced bet device updates its display with game information received from the electronic dealer device in step 801. If step 805 determines that the game or tournament has not yet ended, control again returns to step 801. In alternative embodiments, a user interface (e.g., push buttons) of an electronic forced bet device may be used to remotely control operation of an electronic dealer device.

Figure 9:
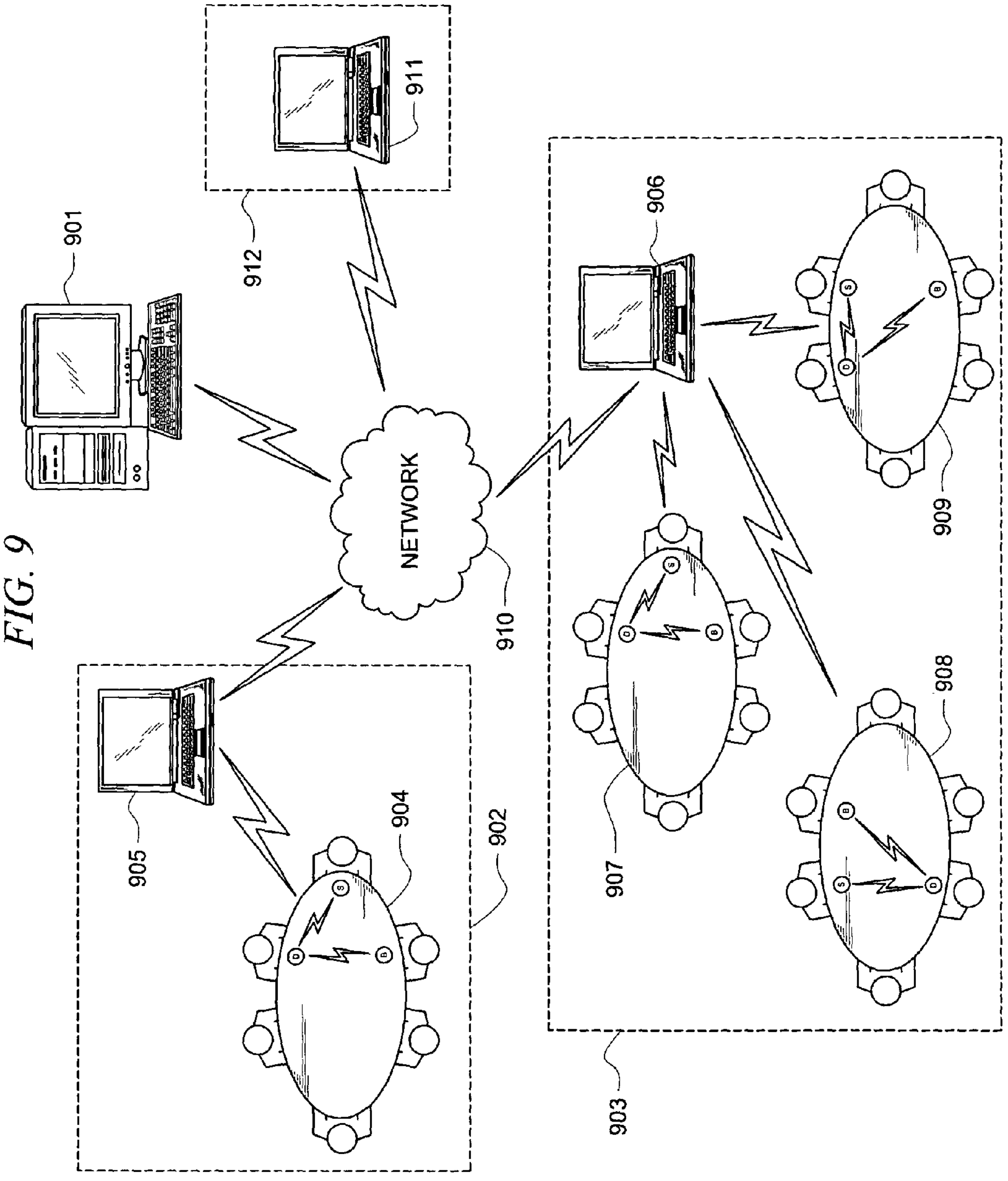
FIG. 9 shows a diagram of multi-table, remote management system according to an embodiment of the present invention.

FIG. 9 shows a diagram of a of multi-table, remote management system 900 according to an embodiment of the present invention. Game management server 901 is operable to communicate data via network 910 to remote locations 902, 903, and 912. In this manner, a game may be played at table 904 in location 902 in coordination with tables 907-909 in location 903. For example, game management sever 901 may transmit game information to computer 905 in location 902, which then transmits that information to a set of game management devices such as the one depicted in FIG. 2.

Game management server may also transmit game information to computer 906 of location 903, which in turn transmits that information to each of the game management devices deployed at tables 907-909. Alternatively, computer 906 may transmit game information to a master electronic dealer button in location 903, and the electronic dealer button may then be responsible for communicating that information to every device in that location. Accordingly, system 900 allows a multi-table tournament may be managed by server 901 among players and tables situated at remote locations from each other.

Moreover, system 900 may also allow players to play a virtual, online portion of the tournament amongst themselves, at least until a predetermined point in the tournament. For instance, a remote player using computer 911 at location 912 may sit at a virtual table with other remote players (not shown), thus participating in the tournament in coordination with other, live players at real tables. Computer 911 may alternatively be used only to check the status of an ongoing tournament and/or to control or manage server 901.

In one alternative embodiment, the game management devices used in tables 902 and/or 903 may establish a direct connections to sever 901 via network 910, thus bypassing computers 905 and/or 906. In yet another alternative embodiment, game management devices may establish direct connections to network 910 and communicate game information amongst themselves, thus bypassing both computers 905 and/or 906, and server 901.

The software, computer program, or code segments making up the various embodiments of the present invention may be stored in a computer readable medium. The term "computer readable medium" includes any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, and the like. Code segments may be downloaded via computer networks such as the Internet, Intranet, or the like.

Figure 10:
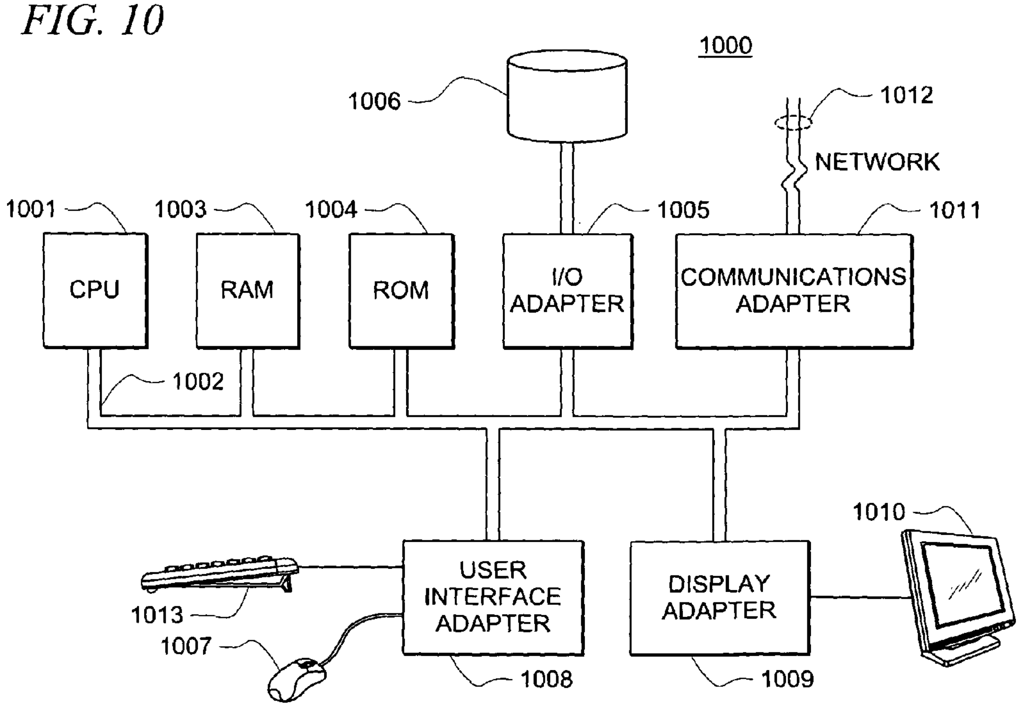
FIG. 10 shows a diagram of a computer system for implementing certain embodiments of the present invention

FIG. 10 illustrates computer system 1000 adapted to implement aspects of certain embodiments of the present invention (e.g., storing and executing software) such as, for example, host computers 905 and 906 and/or server 901 depicted in FIG. 9. Central processing unit ("CPU") 1001 is coupled to system bus 1002. CPU 1001 may be any general purpose CPU. However, embodiments of the present invention are not restricted by the architecture of CPU 1001 as long as CPU 1001 supports the inventive operations as described herein. Bus 1002 is coupled to random access memory ("RAM") 1003, which may be SRAM, DRAM, or SDRAM. ROM 1004 is also coupled to bus 1002, which may be PROM, EPROM, or EEPROM.

Bus 1002 is also coupled to input/output ("I/O") controller card 1005, communications adapter card 1011, user interface card 1008, and display card 1009. I/O adapter card 1005 connects storage devices 1006, such as one or more of a hard drive, a CD drive, a floppy disk drive, a tape drive, to computer system 1000. I/O adapter 1005 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 1011 is adapted to couple the computer system 1000 to network 1012, which may be one or more of a telephone network, a local ("LAN") and/or a wide-area ("WAN") network, an Ethernet network, and/or the Internet. User interface card 1008 couples user input devices, such as keyboard 1013, pointing device 1007, and the like, to computer system 1000. Display card 1009 is driven by CPU 1001 to control the display on display device 1010.

As a person of ordinary skill in the art will readily recognize in light of this disclosure, the systems and methods described herein may be used to manage various types of games, and are not limited to card games only. For example, the present invention may be applied to a variety board games and role playing games (RPGs). In fact, the present invention may be used to electronically manage any non-electronic game by storing, displaying, and/or processing non-electronic game information via one or more electronic game management devices in a coordinated fashion. The term "non-electronic game," as used herein, means a game that is not played directly on an electronic host system, and thus excludes video games and computer games. Finally, particularly with respect to card games, it should immediately appreciated that poker, blackjack, baccarat, and many other types of games may take advantage of the systems and methods depicted herein.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the process, machine, manufacture, means, methods, and steps described herein. As a person of ordinary skill in the art will readily appreciate from this disclosure, other processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

We claim:

1. An electronic dealer game position marker device for managing a multi-player non-electronic card game and marking a dealer position in the multi-player non-electronic card game, the device comprising:

a controller;

a memory coupled to the controller and operable to store information regarding the multi-player non-electronic card game;

a display module coupled to the controller and operable to display at least a first portion of the information regarding the multi-player non-electronic card game; and a communication module coupled to the controller and operable to transmit at least a second portion of the information regarding the multi-player non-electronic card game to an electronic forced bet game position marker device marking a forced bet position in the multi-player non-electronic card game.

2. The device of claim 1, where the communication module is a wireless transceiver.

3. The device of claim 1, where the communication module transmits the portion of the information regarding the multi-player non-electronic card game as the multi-player non-electronic card game progresses between different stages.

4. The device of claim 1, where the information regarding the multi-player non-electronic card game comprises at least one element selected from the group consisting of: a stage number, a stage duration, and an amount of a forced bet.

5. The device of claim 1, where the electronic dealer game position marker device receives the information regarding the multi-player non-electronic card game from a master electronic dealer game position marker device via the communication module.

6. The device of claim 1, where the electronic dealer game position marker device receives the information regarding the multi-player non-electronic card game from a computer via the communication module.

7. The device of claim 1, further comprising a warning module coupled to the controller and operable to indicate a status of operation.

8. The device of claim 3, where the warning module provides a visual signal.

9. The device of claim 3, where the warning module provides an audio signal.

10. The device of claim 1, where the electronic dealer game position marker device downloads information regarding the multi-player non-electronic card game from a computer via the communication module.

11. The device of claim 10, where the downloaded game information is part of a card game template comprising a first stage having a first forced bet amount and a second stage having a second forced bet amount.

12. The device of claim 11, where the electronic dealer game position marker device stores card game progress information.

13. The device of claim 12, where the electronic dealer game position marker device uploads card game progress information to a computer via the communication module.

14. The device of claim 1, where the display module comprises a holographic projection device.

15. An electronic forced bet game position marker device for managing a multi-player non-electronic card game and marking a forced bet position in the multi-player non-electronic card game, the device comprising:

a controller;

a memory coupled to the controller and operable to store information regarding the multi-player non-electronic card game;

a display module coupled to the controller and operable to display the information regarding the multi-player non-electronic card game; and a communication module coupled to the controller and operable to receive the information regarding the multi-player non-electronic card game from an electronic dealer game position marker device marking a dealer position in the multi-player non-electronic card game.

16. A card game management system operable to manage a multi-player non-electronic card game, the system comprising:

an electronic dealer game position marker device operable to display information regarding the multi-player non-electronic card game and to transmit portions of the information regarding the multi-player non-electronic card game to forced bet game position marker devices, the electronic dealer game position marker device configured to physically mark a dealer position in the multi-player non-electronic card game;

a first electronic forced bet game position marker device operable to receive and display a first portion of the information regarding the multi-user non-electronic card game in response to the transmission, the first electronic forced bet game position marker device configured to physically mark a first forced bet position in the multi-player non-electronic card game; and a second electronic forced bet game position maker device operable to receive and display a second portion of the information regarding the multi-user non-electronic card game in response to the transmission, the second electronic forced bet game position marker device configured to physically mark a second forced bet position in the multi-player non-electronic card game.

17. The system of claim 16, where the electronic dealer game position marker device, the first electronic forced bet game position marker device, and the second electronic forced bet game position marker device concurrently display the information regarding the multi-player non-electronic card game, the first portion of the information regarding the multi-player non-electronic card game, and the second portion of the information regarding the multi-player non-electronic card game, respectively, during a multi-player non-electronic card game.

18. The system of claim 16, where the electronic dealer game position marker device is an electronic master dealer game position marker device further operable to transmit the information regarding the multi-player non-electronic card game to a slave electronic dealer game position marker device.

19. The system of claim 18, where the slave electronic dealer game position marker device is further operable to broadcast the first portion of the information regarding the multi-player non-electronic card game to a third electronic forced bet game position marker device and the second portion of the information regarding the multi-player non-electronic card game to a fourth electronic forced bet game position marker device.

20. The system of claim 16, further comprising an external electronic sign operable to receive and display the first and second portions of the information regarding the multi-player non-electronic card game during a multi-player non-electronic card game.

21. A card game management method for managing a multi-player non-electronic card game, the method comprising:

broadcasting at least one portion of information regarding the multi-player non-electronic card game from a dealer game position marker device to a forced bet game position marker device; and presenting the at least one portion of the information regarding the multi-player non-electronic card game to a player during the multi-player non-electronic card game via the forced bet game position marker device while simultaneously presenting at least another portion of the information regarding the multi-player non-electronic game to another player during the multi-player non-electronic card game via the dealer game position marker device.

22. The method of claim 21, further comprising downloading a tournament template from a computer to the dealer game position marker device.

23. The method of claim 22, further comprising providing the tournament template as a web service via the Internet.

24. The method of claim 21, further comprising gathering multi-player non-electronic card game progress information via the dealer device.

25. A card game management system comprising:

a server remotely located with respect to a plurality of card game tables, wherein a multi-player non-electronic card game is played at each of the card game tables, each table having at least one electronic card game management device, wherein the server is operable to manage the multi-player non-electronic card game played among the plurality of card game tables by transmitting instructions containing information regarding the multi-player non-electronic card game via a network to at least a portion of the electronic card game management devices, wherein the at least one card management device is an electronic dealer game position marker device having:

a controller;

a memory coupled to the controller and operable to store information regarding the multi-player non-electronic card game;

a display module coupled to the controller and operable to display at least a portion of the information regarding the multi-player non-electronic card game; and a wireless transceiver module coupled to the controller and operable to transmit at least another portion of the information regarding the multi-player non-electronic card game to an electronic forced bet game position marker device.

26. The system of claim 25, where the electronic card management device is a computer.

27. The system of claim 26, where the computer broadcasts the information regarding the multi-player non-electronic card game to an electronic dealer game position marker device.

28. The system of claim 27, where the electronic dealer game position marker device displays information regarding the multi-player non-electronic card game and broadcasts a portion of the information regarding the multi-player non-electronic card game to a forced bet game position marker device.

29. A method for electronically managing a non-electronic game, the method comprising:

transmitting at least one portion of information regarding the non-electronic game from a master physical game position marker device to a slave physical game position marker device; and presenting the at least one portion of the information regarding the non-electronic game to a player during the non-electronic game via the slave physical game position marker device while simultaneously presenting at least another portion of the information regarding the non-electronic game to another player during the non-electronic game via the master physical game position marker device.

30. The method of claim 29, further comprising downloading non-electronic game information from a computer to the master physical game position marker device.

31. The method of claim 29, further comprising gathering game progress information via the master physical game position marker device.

32. A game management system operable to manage a multi-player non-electronic card game, the system comprising:

a first electronic dealer game position marker device operable to display information regarding the multi-player non-electronic card game and to transmit portions of the information regarding the multi-player non-electronic card game to one or more other game position marker devices, the first electronic dealer game position marker device configured to physically mark a first dealer position in the multi-player non-electronic card game; and a second electronic dealer game position marker device operable to receive at least a portion of the information regarding the multi-player non-electronic card game transmitted by the first electronic dealer game position marker and to display the information regarding the multi-player non-electronic card game, the second electronic dealer game position marker device configured to physically mark a second dealer position in the multi-player non-electronic card game.

33. The system of claim 32, wherein the first electronic dealer game position marker marks the first dealer position at a first game table, and wherein the second electronic dealer game position marker marks the second dealer position at a second game table.

34. The system of claim 32, further comprising:

a first electronic forced bet game position marker device operable to receive and display a first portion of the information regarding the multi-user non-electronic card game transmitted by the first electronic dealer game position marker, the first electronic forced bet game position marker device configured to physically mark a first forced bet position in the multi-player non-electronic card game.

35. The system of claim 34, further comprising:

a second electronic forced bet game position maker device operable to receive and display a second portion of the information regarding the multi-user non-electronic card game transmitted by the first electronic dealer game position marker, the second electronic forced bet game position marker device configured to physically mark a second forced bet position in the multi-player non-electronic card game.

* * * * *

UNITED STATES PATENT AND TRADEMARK OFFICE

CERTIFICATE OF CORRECTION

PATENT NO. : 7,762,887 B1
APPLICATION NO. : 11/633363
DATED : July 27, 2010
INVENTOR(S) : Gene House et al.

It is certified that error appears in the above-identified patent and that said Letters Patent is hereby corrected as shown below:

Column 1, Line 51, delete the portion of text reading “binds” and replace with --blinds--.

Column 12, Claim 16, Line 58, delete the portion of text reading “maker” and replace with --marker--.

Column 16, Claim 35, Line 2, delete the portion of text reading “maker” and replace with --marker--.

Signed and Sealed this

Fifth Day of October, 2010

David J. Kappos
*Director of the United States Patent and Trademark Office*